(12) United States Patent
McGrath et al.

(10) Patent No.: US 12,333,280 B2
(45) Date of Patent: Jun. 17, 2025

(54) SYSTEMS, METHODS, AND DEVICES FOR AUTOMATIC APPLICATION PROGRAMMING INTERFACE MODEL GENERATION BASED ON NETWORK TRAFFIC

(71) Applicant: Salesforce, Inc., San Francisco, CA (US)

(72) Inventors: Keith McGrath, Chicago, IL (US); Carlos Santiago Yanzon, Buenos Aires (AR); Santosh Mankala, Mountain House, CA (US); Scott Glaser, Dublin, CA (US)

(73) Assignee: Salesforce, Inc., San Francisco, CA (US)

( * ) Notice: Subject to any disclaimer, the term of this patent is extended or adjusted under 35 U.S.C. 154(b) by 113 days.

(21) Appl. No.: 17/649,255

(22) Filed: Jan. 28, 2022

(65) Prior Publication Data

US 2023/0168871 A1    Jun. 1, 2023

Related U.S. Application Data

(60) Provisional application No. 63/264,777, filed on Dec. 1, 2021.

(51) Int. Cl.
*G06F 8/35* (2018.01)
*G06F 8/10* (2018.01)

(52) U.S. Cl.
CPC . *G06F 8/35* (2013.01); *G06F 8/10* (2013.01)

(58) Field of Classification Search
CPC .................................. G06F 8/10; G06F 8/35
See application file for complete search history.

(56) References Cited

U.S. PATENT DOCUMENTS

| | | | |
|---|---|---|---|
| 8,739,126 B2 | 5/2014 | Glaser et al. | |
| 8,868,981 B2 | 10/2014 | Glaser et al. | |
| 8,903,943 B2 | 12/2014 | Glaser et al. | |
| 9,229,934 B2 | 1/2016 | Mankala et al. | |
| 9,563,680 B2 | 2/2017 | Mankala et al. | |
| 10,114,737 B2 | 10/2018 | Ramakrishna et al. | |
| 10,261,890 B2 | 4/2019 | Gandham et al. | |
| 10,437,712 B1 * | 10/2019 | Tyler | G06F 11/3684 |
| 10,747,505 B1 * | 8/2020 | Lester | G06F 9/54 |
| 10,970,136 B1 * | 4/2021 | Devine | G06F 9/547 |

(Continued)

*Primary Examiner* — Ziaul A Chowdhury
(74) *Attorney, Agent, or Firm* — Polygon IP, LLP

(57) ABSTRACT

Systems, methods, and devices facilitate generation of application programming interfaces. Systems include a computing platform implemented using a server system, the computing platform being configurable to cause monitoring application programming interface (API) traffic associated with a client service, storing a representation of the API traffic in a database system, the representation including at least an API call identifier and metadata, and generating one or more API models based, at least in part, on the representation of the API traffic, the one or more API models being configured to represent a plurality of API interactions associated with the client service. The computing platform is further configurable to cause generating one or more API objects based, at least in part, on the API models, the one or more API objects being one or more components of a client service API.

16 Claims, 11 Drawing Sheets

(56) References Cited

U.S. PATENT DOCUMENTS

| | | | |
|---|---|---|---|
| 2007/0150722 A1* | 6/2007 | Aaron | H04L 63/10 713/155 |
| 2009/0158238 A1* | 6/2009 | Jung | G06F 9/44 717/100 |
| 2014/0005974 A1 | 1/2014 | Vyas et al. | |
| 2015/0229719 A1* | 8/2015 | Sella | H04L 67/1001 709/217 |
| 2016/0057207 A1* | 2/2016 | Li | H04L 67/10 709/203 |
| 2016/0132573 A1 | 5/2016 | Mankala et al. | |
| 2020/0167209 A1* | 5/2020 | Madhusudhan Nair | G06F 9/54 |
| 2020/0366572 A1* | 11/2020 | Chauhan | H04L 41/5009 |
| 2022/0283885 A1* | 9/2022 | Mackenzie | G06F 8/61 |

* cited by examiner

SYSTEMS, METHODS, AND DEVICES FOR AUTOMATIC APPLICATION PROGRAMMING INTERFACE MODEL GENERATION BASED ON NETWORK TRAFFIC

CROSS-REFERENCE TO RELATED APPLICATIONS

This application claims priority under 35 U.S.C. § 119(e) to U.S. Provisional Application No. 62/264,777, filed Dec. 1, 2021, which is incorporated by reference herein in its entirety for all purposes.

FIELD OF TECHNOLOGY

This patent document relates generally to on-demand software applications, and more specifically to application programming interfaces associated with such on-demand software applications.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

Cloud-based services may include software applications that are implemented in a distributed manner, and have multiple services and microservices distributed across different components of a cloud computing environment. Such services and microservices may be implemented to perform particular tasks and functions of the software applications. Application programming interfaces (APIs) may be used to facilitate communication between such services and applications. Conventional applications remain limited in their ability to instantiate and update APIs in such large-scale and heterogenous computing environments.

BRIEF DESCRIPTION OF THE DRAWINGS

The included drawings are for illustrative purposes and serve only to provide examples of possible structures and operations for the disclosed inventive systems, apparatus, methods and computer program products for content synchronization. These drawings in no way limit any changes in form and detail that may be made by one skilled in the art without departing from the spirit and scope of the disclosed implementations.

DETAILED DESCRIPTION

Software applications may be implemented in a distributed context in which they are provided as an on-demand service, and accessible by multiple users. Such distributed software applications may be implemented using various services that are distributed throughout the distributed computing environment. Such services may use function calls to issue requests and responses to each other, as well as with components of other applications and systems. APIs may be used to facilitate such communication and provide interfaces between heterogenous applications and application components. With large distributed applications with multiple instantiations of various services, the number of APIs becomes very large. Thus, conventional applications remain limited because they are not able to easily propagate updates, generate new APIs, or perform other operations, such as test operations, for such a large number of APIs implemented in such a distributed manner.

Various implementations disclosed herein provide the ability to automatically generate APIs based on observed network traffic. Accordingly, traffic from observed services may form the basis of generating API models, and such API models may be used to generate API objects that may be configured for specific purposes. For example, API objects may be configured in accordance with a particular API specification. In another example, API objects may be configured to facilitate test and validation operations. Thus, as will be discussed in greater detail below, many aspects of the generation of APIs, the configuration of APIs in accordance with API specifications, as well as the test of APIs and use of mock services may be automated, and generated automatically based on observed network traffic. The automatic generation of such APIs and API objects significantly reduces the amount of effort and overhead incurred on a user or customer, and greatly increases the efficiency with which services of distributed applications can be deployed and maintained.

Figure 1:
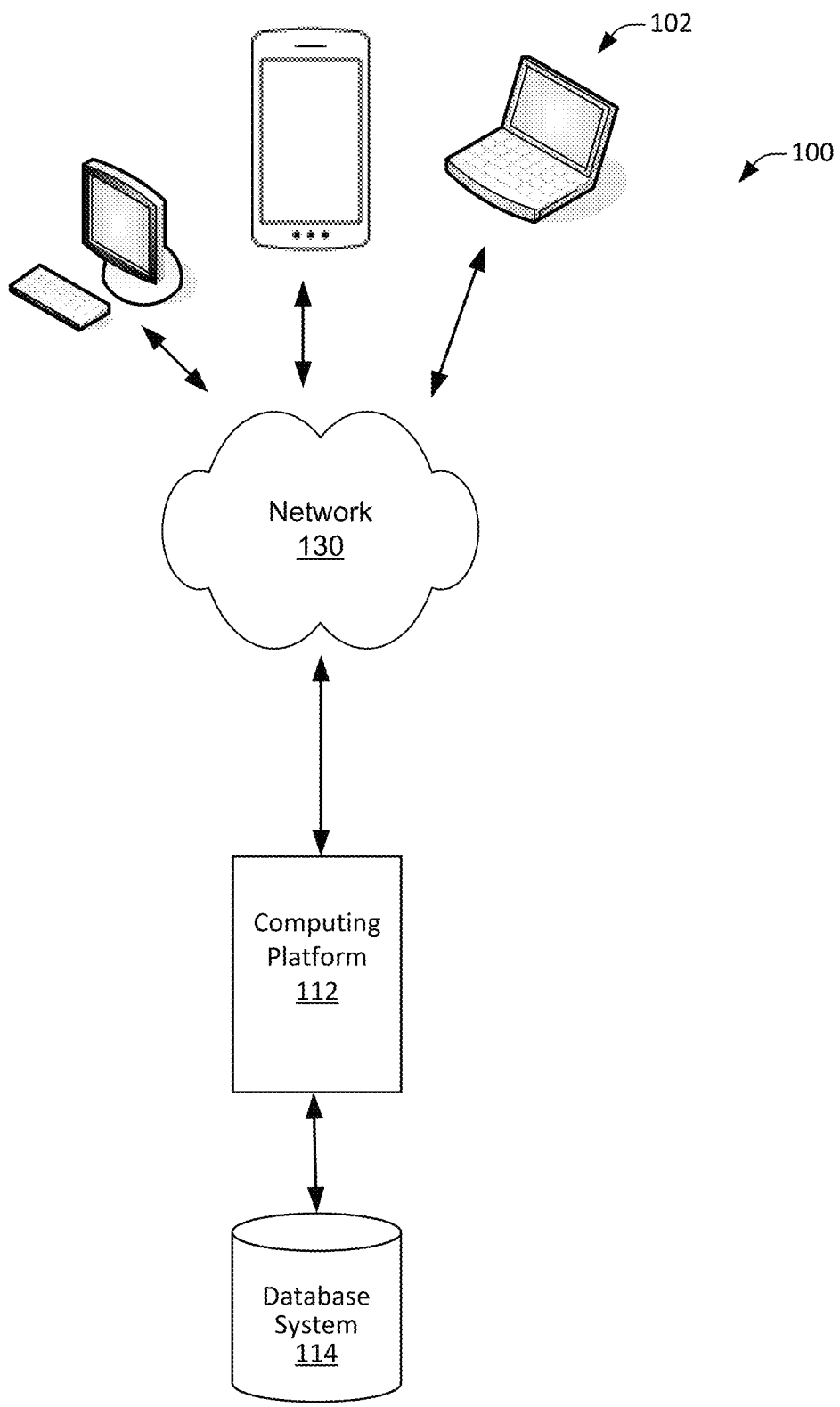
FIG. 1 illustrates an example of an arrangement of components in a distributed system, configured in accordance with one or more implementations.

FIG. 1 illustrates an example of an arrangement of components in a distributed system, configured in accordance with one or more implementations. As will be discussed in greater detail below, a system, such as system 100, may be implemented to facilitate generation of components of APIs, as disclosed herein. More specifically, one or more components of system 100 are configured to make a software application available as an on-demand service, and additional components are configured to facilitate automation of generation of components of APIs that may be used for such an on-demand service.

Accordingly, system 100 includes one or more client machines, which may also be referred to herein as client devices, such as client machine 102. In various implementations, client machine 102 is a computing device accessible by a user. For example, client machine 102 may be a desktop computer, a laptop computer, a mobile computing device such as a smartphone, or any other suitable computing device. Accordingly, client machine 102 includes one or more input and display devices, and is communicatively coupled to communications network 130, such as the internet. In various implementations, client machine 102 comprises one or more processors configured to execute one or more applications that may utilize a user interface. Accordingly, a user may request and view various different display screens associated with such applications via client machine 102. In various implementations, a user interface may be used to present the display screen to the user, as well as receive one or more inputs from the user. In some implementations, the user interface may utilize a web browser executed on client machine 102 or may be a standalone locally executed application. Moreover, such user interfaces may be used to access on-demand services and software applications, as will be discussed in greater detail below.

In various implementations, system 100 further includes one or more servers configured to provide a computing platform, such as computing platform 112, and various client devices may be communicatively coupled to computing platform 112. In various implementations, computing platform 112 is configured to include software and hardware that provides an environment for the execution of an application. As will be discussed in greater detail below, computing platform 112 may include components configured to implement a service layer and a data layer to generate and manage API models used by various hosted services and applications. As will be discussed in greater detail below, computing platform 112 may be configured to capture network traffic and application requests, and further configured to generate API models based on such captured traffic. The API models may then be used to generate various API objects. For example, the API models may be used to generate API specifications, implement test operations, or mock services.

As will be discussed in greater detail below, API models may be data structures configured to store various data describing interactions between components in an interface. More specifically, an API model may store metadata of a service path, such as a path, execution location, and version number associated with a service. The API model may store specific data objects, such as sub-models, that may be models specific to particular responses and requests. For example, an API model may include request models and response models. Such request models and response models may each include metadata, such as a path, status code, operation identifier, and link or hyperlink for a specific a response or request. In various implementations, responses and requests that are linked may be identified and stored as interactions within the API model. Accordingly, the API model may store a collection of request and response models, and may identify interactions based on identified links between such request and response models.

Computing platform 112 may include one or more processors and memory configured execute a software application. Accordingly, computing platform 112 may be configured to store program code and settings for a particular application, and may also be configured to execute the code. Moreover, computing platform 112 may be in communication with numerous client devices, and may implement the application in a distributed manner. In some implementations, computing platform 112 is further configured to generate and serve webpages that may be viewed by a user via one or more devices, such as client machine 102. Accordingly, computing platform 112 is configured to provide a web-based interface between a user of client machine 102 and an application that is deployed in a distributed environment. In some implementations, computing platform 112 is coupled to database system 114 which may be configured to store various application data and data associated with webpages served by computing platform 112, and thus may provide local storage for computing platform 112.

Figure 2:
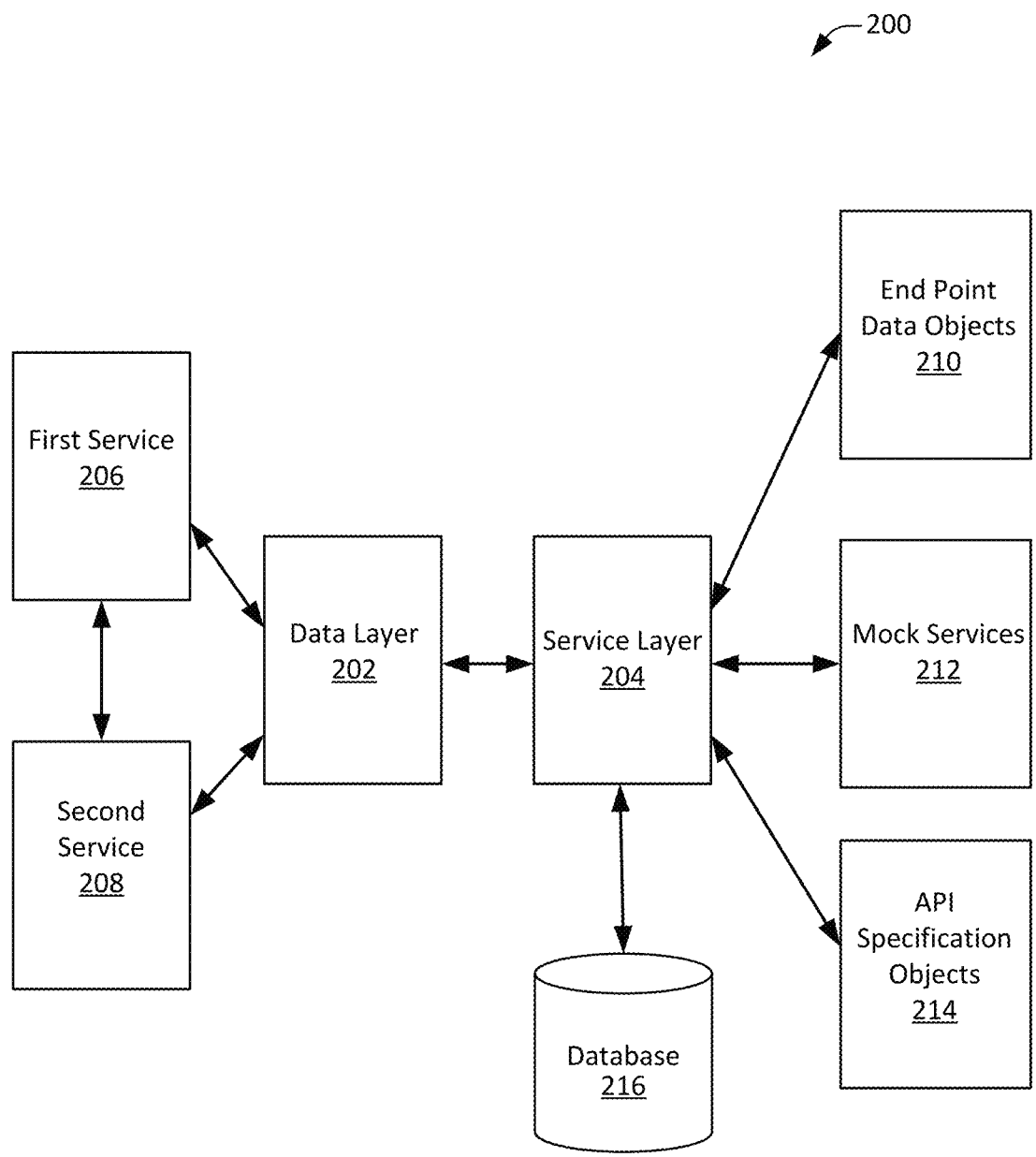
FIG. 2 illustrates another example of an arrangement of components in a distributed system, configured in accordance with one or more implementations

FIG. 2 illustrates another example of an arrangement of components in a distributed system, configured in accordance with one or more implementations. As discussed above, a computing platform may be configured to facilitate the automation of generation of various components of APIs. Accordingly, a system, such as system 200, may be implemented in the context of a containerized environment. More specifically, various components of an application that is an on-demand service may be implemented in a containerized environment, and with multiple services and microservices for different functions of the application. As will be discussed in greater detail below, traffic between such services may be used to automatically generate API models and associated API objects. In this way, the generation and testing of APIs in a complex containerized computational environment is greatly improved.

System 200 includes various services, such as first service 206 and second service 208. In various implementations, first service 206 and second service 208 are services of a distributed on-demand application. Accordingly, each service may represent a particular function of that application. Moreover, first service 206 and second service 208 may be for different applications. As shown in FIG. 2, first service 206 and second service 208 may be in communication with each other, and may issue on or more function calls between each other. As discussed above, each of first service 206 and second service 208 may be implemented in separate containers, respectively.

System 200 additionally includes various processing layers, such as data layer 202 and service layer 204. As will be discussed in greater detail below, data layer 202 and service layer 204 may be configured to perform operation underlying the generation of API models and API objects. Accordingly, data layer 202 may be configured to monitor traffic between different services. More specifically, data layer 202 is configured to provide a network traffic mesh within system 200 that facilitates communication between different services hosted within system 200. Accordingly, data layer 202 has access to network traffic, and is able to monitor and observe network traffic. As will be discussed in greater detail below, data layer 202 may be configured to monitor and process calls made to and from APIs associated with such services.

In various implementations, service layer 204 is configured to generate API models and API objects based on the traffic captured by data layer 202. Accordingly, service layer 204 may utilize such observed traffic to generate models of interactions between services, and generate models of APIs between services and/or other entities. As will be discussed in greater detail below, the API models and objects generated by service layer 204 may be used by other system components to implement and test specific instances of APIs. Accordingly, the API models and objects may be generated by service layer 204 automatically, and may be stored in a central repository for use by other entities to generate and test instances of APIs. In this way, the storage and maintenance of such API models and instances improves the efficiency with which APIs may be updated, generated, and tested.

In various implementations, service layer 204 is coupled to database 216, which is configured to store various data objects, such as API object and API models used by and generated by service layer 204. Moreover, according to some implementations, first service 206, second service 208, data layer 202, and service layer 204 are implemented in a clustered environment. More specifically, they may be implemented within a Kubernetes cluster. Accordingly, the components included in system 200 may be implemented in the context of a distributed cluster of containers.

System 200 additionally includes various components of endpoints. For example, system 200 includes end point data objects 210 which are configured to provide one or more functionalities that may be specific to a particular end point user. For example, a customer or client of an on-demand service may request the generation of a particular data object from the on-demand service. In various embodiment, such a data object may be generated by one or more services, and may be stored and returned via end point data objects 210. In one example, a customer using an on-demand service for contract generation may utilize the on-demand service to automatically generate portions of the contract, and such portions of the contract may be stored at and returned via end point data objects 210.

System 200 additionally includes mock services 212 which are configured to simulate one or more live services. Accordingly, mock services 212 may be generated in response to a request from a customer or a client, and may be generated based, at least in part, on one or more API specifications or objects. For example, a mock service may be generated in response to a request from a customer, and may include an API generated based on the API specifications and objects stored in database 216. In this way, mock services 212 may instantiated by customers to simulate live services before they are deployed.

System 200 further includes API specification objects 214 which are configured to define API functions and interactions. Accordingly, API specification objects 214 may be configured to define particular functions and interactions supported by a particular API specification, as well as data objects or entities associated with such functions and interactions. In some implementations, API specification objects 214 include a particular API model compatible with a particular API specification and instantiated for a particular entity, such as a client machine. Accordingly, a user or client entity may have requested the generation of an API specification object, and such an API specification object may be stored in API specification objects 214.

Figure 3:
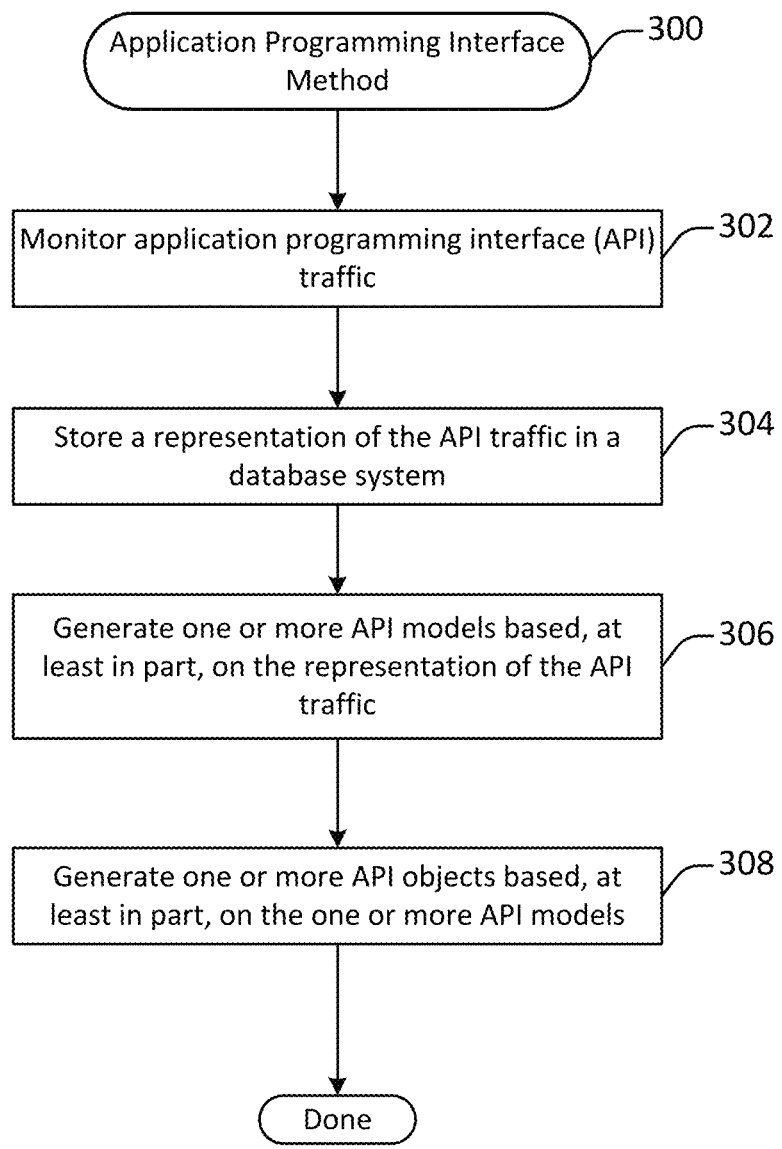
FIG. 3 illustrates an example of a method for application programming interface model generation, according to one or more implementations.

FIG. 3 illustrates an example of a method for application programming interface model generation, according to one or more implementations. As discussed above, a computing platform may be configured to facilitate the automation of generation of various components of APIs. Accordingly, a method, such as method 300, may be performed to facilitate generation of such APIs in a containerized on-demand service environment. As will be discussed in greater detail below, method 300 may monitor traffic between services, and may automatically generate API models and associated API objects based on such traffic. In this way, the generation and testing of APIs in a complex containerized computational environment is greatly improved.

Method 300 may perform operation 302 during which application traffic may be monitored. As similarly discussed above, services of distributed applications may be in communication with each other, and may send function calls to and from each other. The communication may occur via a network mesh or other topology, and a data layer facilitating the network topology may be log interactions between various services. As will be discussed in greater detail below, the observed services may be designated by an entity, such as a user or customer, or may be designated by a system component.

Method 300 may perform operation 304 during which a representation of the application traffic may be stored in a database system. Accordingly, during operation 304, a representation of each observed interaction may be stored, and such representations may include one or more data values characterizing the interaction. For example, the one or more data values may identify a source and a target of a function call, an identifier that identifies a type or identify of a function underlying the call, as well as various metadata, such as timestamp information, associated with the function call.

Method 300 may perform operation 306 during which one or more API models may be generated based, at least in part, on the representations of the application traffic. Accordingly, the stored representations of interactions may be combined to data structures representative of the APIs themselves. In this way, models of APIs may be generated and stored based on observed network traffic. Additional details regarding the generation of such API models is discussed in greater detail below.

Method 300 may perform operation 308 during which one or more API objects may be generated based, at least in part, on the one or more API models. Accordingly, API objects, such as API specification objects, test objects, or other end point data objects may be generated based on one or more API models. More specifically, the API models may be used to generate specific data objects in response to particular requests, such as a request for an API compatible with a particular API specification, or a request for a particular end point data object. The API objects may be stored in a database system and/or may be returned to a user or customer via an endpoint. Additional details regarding the generation of such API objects is discussed in greater detail below.

Figure 4:
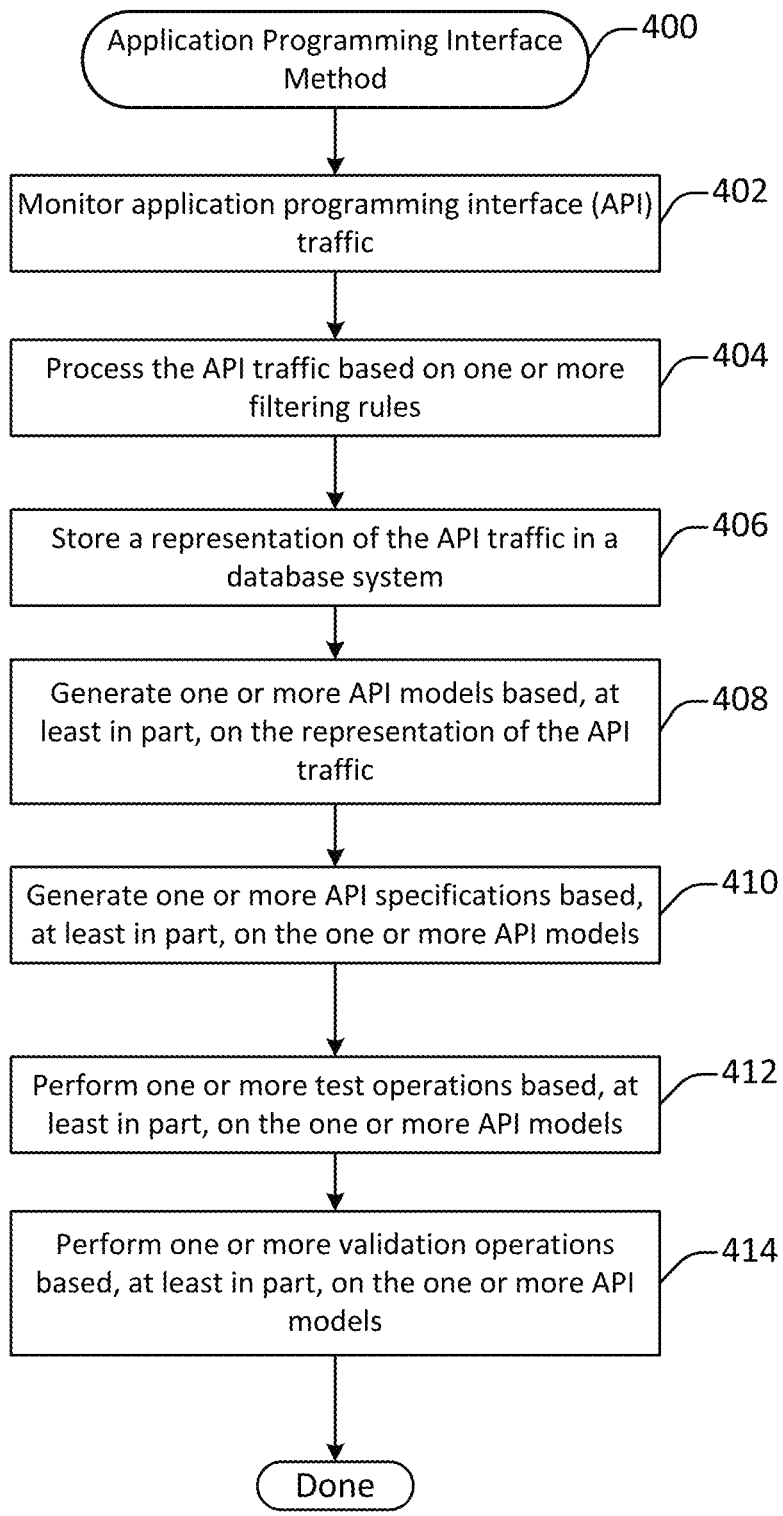
FIG. 4 illustrates another example of a method for application programming interface model generation, according to one or more implementations.

FIG. 4 illustrates another example of a method for application programming interface model generation, according to one or more implementations. As discussed above, a computing platform may be configured to facilitate the automation of generation of various components of APIs. Accordingly, a method, such as method 400, may be performed to monitor traffic between services, and may automatically generate API models and associated API objects based on such traffic. As will be discussed in greater detail below the API models may also be used to generate API specifications, as well as to implement test and validation operations of APIs.

Method 400 may perform operation 402 during which application traffic may be monitored. As similarly discussed above, services of distributed applications may be in communication with each other, and may send function calls to and from each other. The communication may occur via a network mesh or other topology, and a data layer facilitating the network topology may be log interactions between various services. In various implementations, the observed services may be designated by an entity, such as a user or customer, or may be designated by a system component. More specifically, the observed services may be identified by a list that may be specified by a user. In one example, the observed services may be identified based on services associated with an existing API, or other application information.

Method 400 may perform operation 404 during which the application traffic may be processed based on one or more filtering rules. In some implementations, filtering rules may define one or more filtering criteria that may be used to pre-process interactions and define filters for interactions included in API models. For example, particular types of function calls may be excluded, or function calls to and from particular services may be excluded. Such filter criteria may be specified by a user and stored as filter parameters.

Method 400 may perform operation 406 during which a representation of the application traffic may be stored in a database system. Accordingly, during operation 406, representations of the filtered interactions may be stored, and such representations may include one or more data values characterizing the interactions. For example, the one or more data values may identify a source and a target of a function call, an identifier that identifies a type or identify of a function underlying the call, as well as various metadata, such as timestamp information, associated with the function call.

Method 400 may perform operation 408 during which one or more API models may be generated based, at least in part, on the representations of the application traffic. As similarly discussed above, the stored representations of interactions may be combined to data structures representative of the APIs themselves. In this way, models of APIs may be generated and stored based on observed network traffic. Additional details regarding the generation of such API models is discussed in greater detail below.

Method 400 may perform operation 410 during which one or more API specification objects may be generated based, at least in part, on the one or more API models. As discussed above, API specifications may define standardized API functions and interactions. In some implementations, the API specification may be specific to a particular operating system or a particular programming language. Accordingly, during operation 410, one or more API models may be updated or modified based on an API specification to generate API specification objects. In this way, the API models may be used to generate specific API specification objects that are configured for specific API specifications.

Method 400 may perform operation 412 during which one or more test operations may be performed based, at least in part, on the one or more API models. In various implementations, the test operations may be performed to test operation of a generated API. Accordingly, an API model may be deployed as part of a mock service, and functions of the API model may be tested. Accordingly, specific function calls may be tested, and operation of the API may be confirmed by a user.

Method 400 may perform operation 414 during which one or more validation operations may be performed based, at least in part, on the one or more API models. In various implementations, the validation operations may be performed to validate one or more portions of code of the generated API. Accordingly, the API model may undergo one or more validation operations, and validity of the API code may be confirmed.

Figure 5:
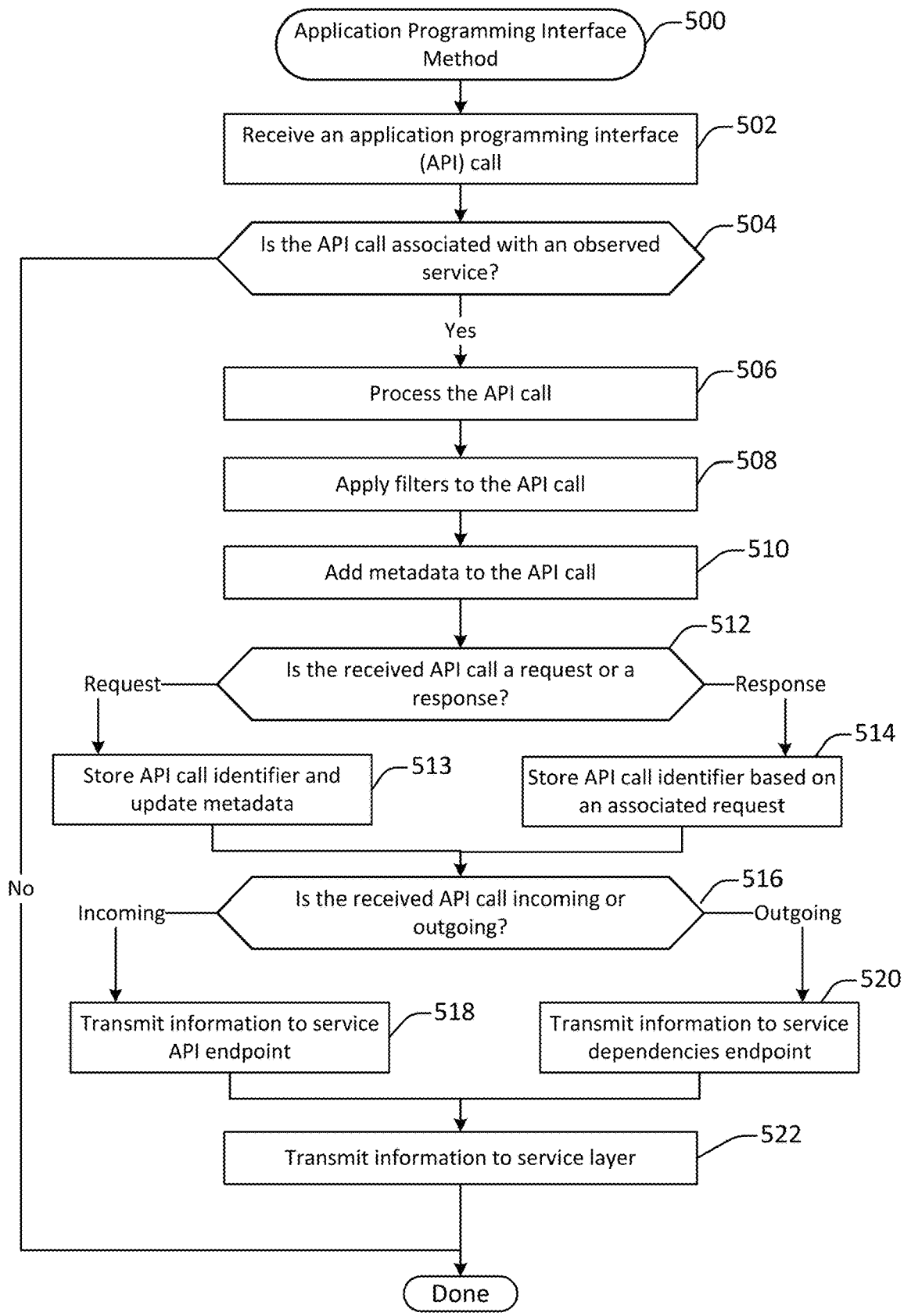
FIG. 5 illustrates yet another example of a method for application programming interface model generation, according to one or more implementations.

FIG. 5 illustrates yet another example of a method for application programming interface model generation, according to one or more implementations. As discussed above, a computing platform may be configured to facilitate the automation of generation of various components of APIs. Accordingly, a method, such as method 500, may be performed to monitor traffic between services. As will be discussed in greater detail below, the monitoring of traffic may involve pre-processing of function calls in a data layer, which may be a network layer between service components, to generate interaction data that may be used by a service layer.

Method 500 may perform operation 502 during which an API call may be received. As similarly discussed above, the API call may be received via one or more components of a network topology. Accordingly, the API call may originate from a service, and may be identified and received by a component of the network topology. As discussed above, the API call may be a function call that includes various identifiers identifying a target and source of the function call as well as an identity of the underlying function.

Method 500 may perform operation 504 during which it may be determined if the API call is associated with an observed service. As similarly discussed above, such a determination may be made based on a designated list of observed services. Accordingly, a list of observed services may have been designated by an entity, such as a user, and the determination may be made based on a comparison of an identifier included in the API call and identifiers included in the designated list. If it is determined that the API call is not associated with an observed service, method 500 may terminate. If it is determined that the API call is associated with an observed service, method 500 may proceed to operation 506.

Accordingly, during operation 506, the API call may be processed. In various embodiments, the processing may include parsing information from the API call and/or storing such information in a data object having a particular data structure. Thus, during operation 506, the API call may be processed to store information included in the API call in a format and data structure that may be used in other operations of the data layer, as will be discussed in greater detail below.

Method 500 may perform operation 508 during which one or more filters may be applied to the API call. As discussed above, filtering rules may define one or more filtering criteria that may be used to pre-process interactions and define filters for interactions included in API models. For example, particular types of function calls may be excluded, or function calls to and from particular services may be excluded. Such filter criteria may be specified by a user and stored as filter parameters. Accordingly, during operation 508, the filters may be applied to the API call.

Method 500 may perform operation 510 during which metadata may be added to the API call. Accordingly, appropriate metadata may be generated and added to the API call. The metadata may include additional identifiers as well as additional contextual information, such as timestamp information.

Method 500 may perform operation 512 during which it may be determined if the received API call is a request or a response. In various implementations, such a determination may be made based on one or more identifiers included in the API call. As discussed above, the API call may include identifiers that represent a type of function call underlying the API call. Accordingly, such an identifier may be used to determine if the API call is a request or a response. If it is determined that the API call is a request, method 500 may proceed to operation 513.

Accordingly, during operation 513, an API call identifier may be stored and metadata may be updated. Thus, the identifier for the API call may be stored, and the associated metadata may be updated as well. In various implementations, the API call identifier may be stored in a data object that will subsequently be transmitted to a service layer, as will be discussed in greater detail below.

Returning to operation 512, if it is determined that the received API call is a response, method 500 may perform operation 514 during which an API call identifier may be stored based on an associated request. Accordingly, the API call may be a response, and it may be mapped to an associated request based on a designated mapping. Information about the associated request may also be retrieved, such as a request identifier. In various implementations, the response and request identifiers may be stored.

Method 500 may perform operation 516 during which it may be determined if the received API call is incoming or outgoing. As similarly discussed above, such a determination may be made based on one or more identifiers included in the API call. More specifically, the API call may include identifiers that represent a type of function call underlying the API call. If it is determined that the API call is incoming, method 500 may proceed to operation 518.

Accordingly, during operation 518, information may be transmitted to an API endpoint. Thus, the information collected and stored during method 500 thus far may be transmitted to an API endpoint. As discussed above, the API endpoint may be accessible by a user, customer, or other entity, and during operation 518, information may be transmitted to such an API endpoint.

Returning to operation 516, if it is determined that the received API call is outgoing, method 500 may perform operation 520 during which information may be transmitted to a service dependencies endpoint. Thus, a dependencies mapping may be used to identify a particular API endpoint, and during operation 520, information may be transmitted to the identified API endpoint.

Method 500 may perform operation 522 during which information may be transmitted to a service layer. Accordingly, the information stored during method 500 may be transmitted to a service layer for additional processing. As will be discussed in greater detail below, the interactions and API calls captured during method 500 may be used by the service layer to generate API models and API objects. Additional details regarding such operations are discussed in greater detail below. Moreover, additional iterations of method 500 may be implemented. Accordingly, additional API calls may be received, and additional information may be transmitted to the service layer. In this way, method 500 may be implemented periodically and/or dynamically to ingest multiple API calls that occur over the network topology.

Figure 6:
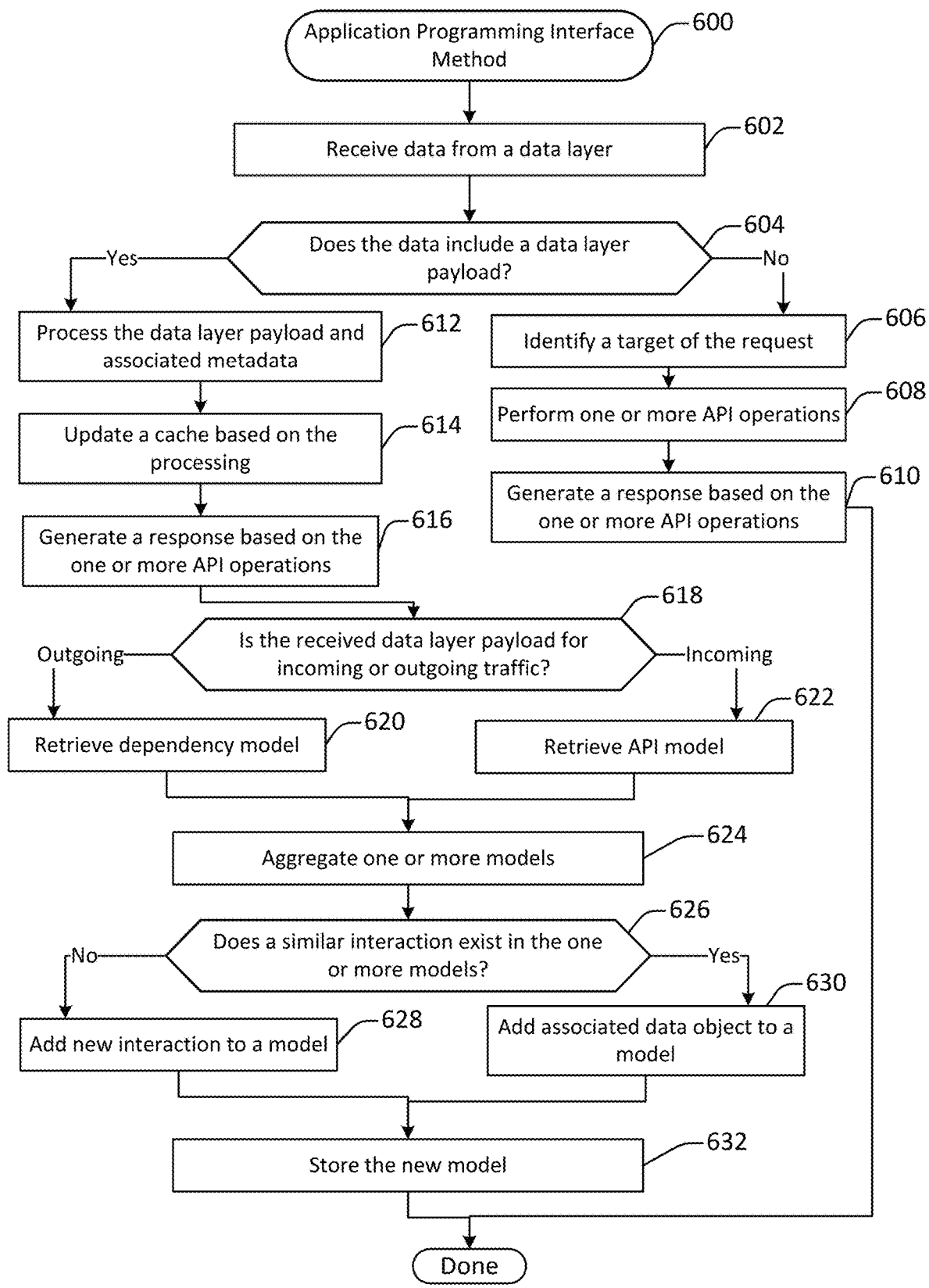
FIG. 6 illustrates an additional example of a method for application programming interface model generation, according to one or more implementations.

FIG. 6 illustrates an additional example of a method for application programming interface model generation, according to one or more implementations. As discussed above, a computing platform may be configured to facilitate the automation of generation of various components of APIs. Accordingly, a method, such as method 600, may be performed to process observed interactions and to facilitate API model generation. As will be discussed in greater detail below, observed interactions may be processed and used to construct API models as well as dependency models.

Method 600 may perform operation 602 during which data may be received from a data layer. In various embodiments, the data received from the data layer may be interaction data that represents interactions captured by the data layer. As discussed above, the interaction data may have been captured by the data layer which may be a network layer between service components.

Method 600 may perform operation 604 during which it may be determined if the data includes a data layer payload. As will be discussed in greater detail below, the data layer payload may include data received from an API endpoint. In various implementations, the data layer payload may include interaction data tha tis pre-processed for a service layer, which may be a layer where service components are installed. Accordingly, data generated in accordance with method 500 may be stored as a data layer payload. In various implementations, contents of the received data may be checked for one or more identifiers or a header identifying the data layer payload. As will also be discussed in greater detail below, the data received might not include a data layer payload, and may instead include data associated with a request from a user, such as a user request for a service component. In this way, it may be determined if data received from the data layer includes a data layer payload with interaction data. If it is determined that the data does not include a data layer payload, method 600 may proceed to operation 606.

Accordingly, during operation 606, a target of a request may be identified. As discussed above, the request may be a user request for a particular service component, or for the generation of an API object associated with a service component. Thus, the received at a may include a function call that is a request for a specific API object. In various implementations, one or more identifiers included in the request may be used to identify a particular type of API object. In various implementations, the request may be for particular API operation, as will be discussed in greater detail below with reference to FIG. 7. For example, the request may be for a particular type of API object for a specific implementation or instance of a service component in the service layer.

Method 600 may perform operation 608 during which one or more API operations may be identified. In various implementations, one or more API operations may be implemented to generate a particular API object. As will be discussed in greater detail below, the API operations may include the translation of an API model into a particular API object, such as an API specification object, a test data object, or a mock service object. Accordingly, during operation 608, such an API object may be generated based, at least in part, on one or more identifiers included in the request.

Method 600 may perform operation 610 during which a response may be generated based on the one or more API operations. Accordingly, a response may be generated that includes the result of the one or more API operations. In some implementations, the response includes the API object, and the response may be transmitted to deploy the API object at a location of a distributed environment, such as an end point.

Returning to operation 604, if it is determined that the data includes a data layer payload, method 600 may perform operation 612 during which the data layer payload and associated metadata may be processed. Accordingly, during operation 612, the received data may be parsed to extract payload data and metadata that may be used for subsequent operations.

Method 600 may perform operation 614 during which a cache may be updated based on the processing. As will be discussed in greater detail below with reference to FIG. 8, the cache may be updated to include or to remove interaction data based on whether or not the received data includes a request, or includes a response associated with a previously stored request. In this way, linked responses and requests may be identified and stored as interactions, and unlinked responses and requests may be discarded.

Method 600 may perform operation 616 during which a response may be generated based on one or more API operations. In various implementations, the response may include an updated and aggregated API request model and aggregated API response model that has been updated based on the received payload data and metadata. Accordingly, as similarly discussed above, models may be generated and updated for requests and responses, and may collectively be used to generate API models as collections of those request models and response models.

Method 600 may perform operation 618 during which it may be determined if the data layer payload is for incoming or outgoing traffic. As similarly discussed above, the data layer payload may include one or more identifiers or a header identifying aspects of an underlying function call. Accordingly, the received data may be used to determine the function call is incoming or outgoing. For example, such a determination may be made based on an identified source and target of a request. More specifically, an inbound call may be triggered by a user or an external entity. An outbound call may be generated by a service implemented in the service layer. As will be discussed in greater detail below inbound and outbound may be processed and modeled separately to facilitate accurate modeling of each respectively.

If it is determined that the data layer payload is for outgoing traffic, method 600 may perform operation 620 during which a dependency model may be retrieved. Accordingly, a dependency model may be retrieved from a storage location of a database system. The dependency model may have been previously generated during API model and dependency model generation operations, or may have been received as application code. In one example, the dependency model may be retrieved from a storage location designated for data persistence. In various implementations, dependency models are the same data structures and models as API models, but are maintained separately from API models, and are configured to track and store interaction data outbound from observed services to their respective dependencies, which may be other databases or other service components. Accordingly, dependency models may be models that are specifically configured to represent outbound traffic from observed services.

If it is determined that the data layer payload is for incoming traffic, method 600 may perform operation 622 during which an API model may be retrieved. Accordingly, an API model may be retrieved from a storage location of a database system. The API model may have been previously generated during API model generation operations, or may have been received as application code. In one example, the API model may be retrieved from a storage location designated for data persistence. As discussed above, the API model may model various interactions, such as linked requests and responses. Accordingly, an existing API model may be identified and retrieved from a storage location.

Method 600 may perform operation 624 during which one or more models may be aggregated. Accordingly, dependency model information and API model information may be retrieved and aggregated to combine received request and dependency model information with any previously stored data. In this way, a updated dependency models and API models may be generated during operation 624. As discussed above, the API models and dependency models may have the same data structure. Accordingly, the aggregation of models may be implemented based on a merger of data objects. For example, existing interactions in the existing models may be merged with the newly received interactions, and new interactions may be added if no interaction previously existed.

Method 600 may perform operation 626 during which it may be determined if a similar interaction may exist in one or more models. In various implementations, such a determination may be made based on one or more difference criteria or parameters. For example, an amount or a percentage of code matching may be specified as a difference threshold. A difference threshold value of 0% may indicate that each interaction should be treated as different and each interaction should be treated as new and will be added. A difference threshold value of 100% may specify that matched interactions are always aggregated. Moreover, a difference threshold value in between such values, such as a value X that may be 0%<X<100%, then the specified threshold value may provide a threshold for which a value less than X indicates that a new interaction and an existing interaction are not sufficiently different, should be treated as the same, and should be aggregated/merged. Moreover, a threshold value greater than X indicates that a new interaction and an existing interaction are sufficiently different, should be treated as different interactions, and a new interaction may be stored. Such difference threshold values may be determined based on user-defined parameters and inputs, or based on conditions inferred from other service components.

It will be appreciated that any suitable technique may be used to compare the interaction identified by the received data with other interactions included in the API model as well as other API models to determine if a similar interaction exists. For example, such a determination may be made based on comparisons of features of the function call, such as a same source, target, and function/operation. Accordingly, comparisons of source and target identifiers as well as comparisons of other metadata fields, such as path and execution location, may be compared in accordance with one or more rules. Such rules may be predetermined and may define a match based on, for example all fields matching, or a designated number of fields matching, or a specific set of fields matching. In various implementations, such rules may be user-defined, or may be defined by another entity, such as an administrator.

If it is determined that a similar interaction does not exist, method 600 may perform operation 628 during which a new interaction may be added to a model. Accordingly, if no match is found in the API models, the new interaction may be added to the API model. As discussed above, this may include adding the request and response models underlying the interaction into the API model. In this way, the API model may be updated to include and model the new functionality represented by the new interaction and its associated identifiers and metadata.

If it is determined that a similar interaction does exist, method 600 may perform operation 630 during which an associated data object may be added to a model. In various implementations, the associated data object may include the interaction data as well as a label that identifies an amount of a difference or similarity with another interaction in the API model. For example, if the received interaction is similar to an existing interaction, it may be stored within the API model along with a similarity score. In various implementations, such a similarity score may be determined based on one or more difference computations. For example, one or more difference algorithms, such as edelta, xdelta, and VCDiff. In some implementations, differences identified by such difference algorithms may be converted to a similarity or difference score by determining a percentage of code that is different based on a comparison of the amount of code identified as different with the overall amount of code.

In some implementations, if the received interaction is sufficiently similar to an existing interaction and has a high similarity score or low difference value, it may be discarded and not included in the API model at all, or may be included in the API model with a label or identifier marking it as optional. In various implementations, if the received interaction is sufficiently different from existing interactions and has a low similarity score or high difference value, it may be included in the API model. Accordingly, a similarity or difference value threshold may be used to determine which, if any, data should be included and stored as an associated data object.

Method 600 may perform operation 632 during which the new model may be stored. Accordingly, the new and updated API model may be stored in a storage location of a database system. As similarly discussed above, the API model may be used for the purposes of generating instances of APIs as well as particular API objects. In this way, an API model may be generated, and may be made accessible to various other system components to facilitate automatic API generation.

Figure 7:
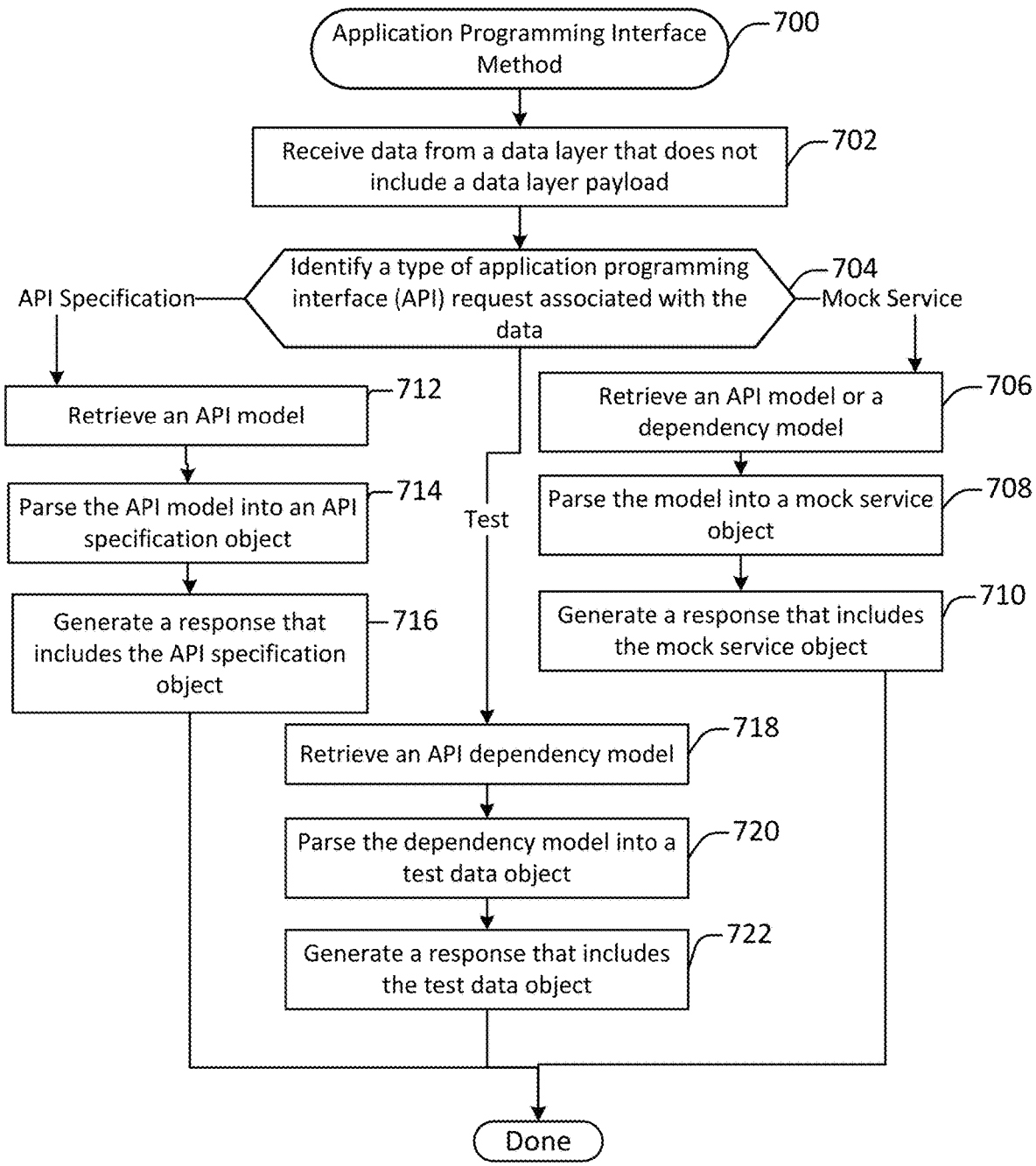
FIG. 7 illustrates another example of a method for application programming interface model generation, according to one or more implementations.

FIG. 7 illustrates another example of a method for application programming interface model generation, according to one or more implementations. As discussed above, a computing platform may be configured to facilitate the automation of generation of various components of APIs and API models. Accordingly, a method, such as method 700, may be performed to generate specific API models. As will be discussed in greater detail below, a particular API model may be translated to one or more specific types of API model.

Method 700 may perform operation 702 during which data may be received from a data layer. In various implementations, the data does not include a data layer payload. Accordingly, method 700 may be performed responsive to determining that received data does not include a data layer payload, and instead includes a request. As discussed above, the request may be received from an entity, such as a user, and may be for a particular API object, such as a particular API specification, a test object, or a mock service.

Method 700 may perform operation 704 during which a type of an API request associated with the data may be determined. In various implementations, such a determination may be made based on information included in the API request. For example, the API request may identify a particular type of API object that is being requested. The API request may be identified based on information included in the received data, and the requested type of API object may be identified based on one or more associated identifiers. For example, a requested type of API object may be a mock service, a test data object, or an API specification object. In various implementations, if it is determined that the API request is for mock service, method 700 pay proceed to operation 706.

Method 700 may perform operation 706 during which an API model or a dependency model may be retrieved. Accordingly, an appropriate model may be retrieved based on a type of API call underlying the API object request. As discussed above, the API models and dependency models may be stored in a database system. Accordingly, during operation 706, a particular model may be identified based on the identifiers discussed above, and may be retrieved.

Method 700 may perform operation 708 during which the model may be parsed into a mock service. Accordingly, the data stored in the retrieved model may be parsed to extract information that is then stored as a mock service. In this way, the model is translated to a data structure of a mock service, and the newly generated mock service object may be stored in the database system as well.

Method 700 may perform operation 710 during which a response may be generated that includes the mock service. Accordingly, the mock service object may be provided to another entity, such as a component of an endpoint, or other location in the computing platform. As previously discussed, the mock service object may be used to simulate the operation of a service, and to verify its functionality.

Returning to operation 704, if it is determined that the API request is for an API specification object, method 700 may perform operation 712 during which an API model may be retrieved. As discussed above, the API model may be a data structure that represents interactions of an API. Accordingly, during operation 712, a particular API model may be identified based on data, such as one or more identifiers associated with a function call, received at operation 702, and the API model may be retrieved.

Method 700 may perform operation 714 during which the API model may be parsed based into an API specification object. Accordingly, the data stored in the retrieved API model may be parsed to extract information that is then stored as an API model that is compatible with a particular API specification. In this way, the API model is translated to a data object that is configured to be compliant with a particular API specification, and the newly generated API specification object may be stored in the database system. In various implementations, the API specification may be identified based on the data received during operation 702. For example, the data may include a function call that uses a particular API specification.

Method 700 may perform operation 716 during which a response may be generated that includes the API specification object. Accordingly, the API specification object may be provided to another entity, such as a component of an endpoint, or other location in the computing platform. As previously discussed, the API specification object may be used to implement a novel instantiation of an API.

Returning to operation 704, if it is determined that the API request is for a test data object, method 700 may perform operation 718 during which an API dependency model may be retrieved. Accordingly, an appropriate dependency model may be retrieved based on a type of API call underlying the API request. As discussed above, the API dependency models may be stored in a database system. Accordingly, during operation 706, a particular API dependency model may be identified based on the identifiers discussed above, and may be retrieved.

Method 700 may perform operation 720 during which the dependency model may be parsed into a test data object. Accordingly, the data stored in the retrieved API dependency model may be parsed to extract information that is then stored as a test data object. In this way, the API dependency model is translated to a data structure of a test data object, and the newly generated test data object may be stored in the database system as well.

Method 700 may perform operation 722 during which a response may be generated that includes the test data object. Accordingly, the test data object may be provided to another entity, such as a component of an endpoint, or other location in the computing platform. As previously discussed, the test data object may be used to implement various test operations to test the operation of one or more components of a newly instantiated API.

Figure 8:
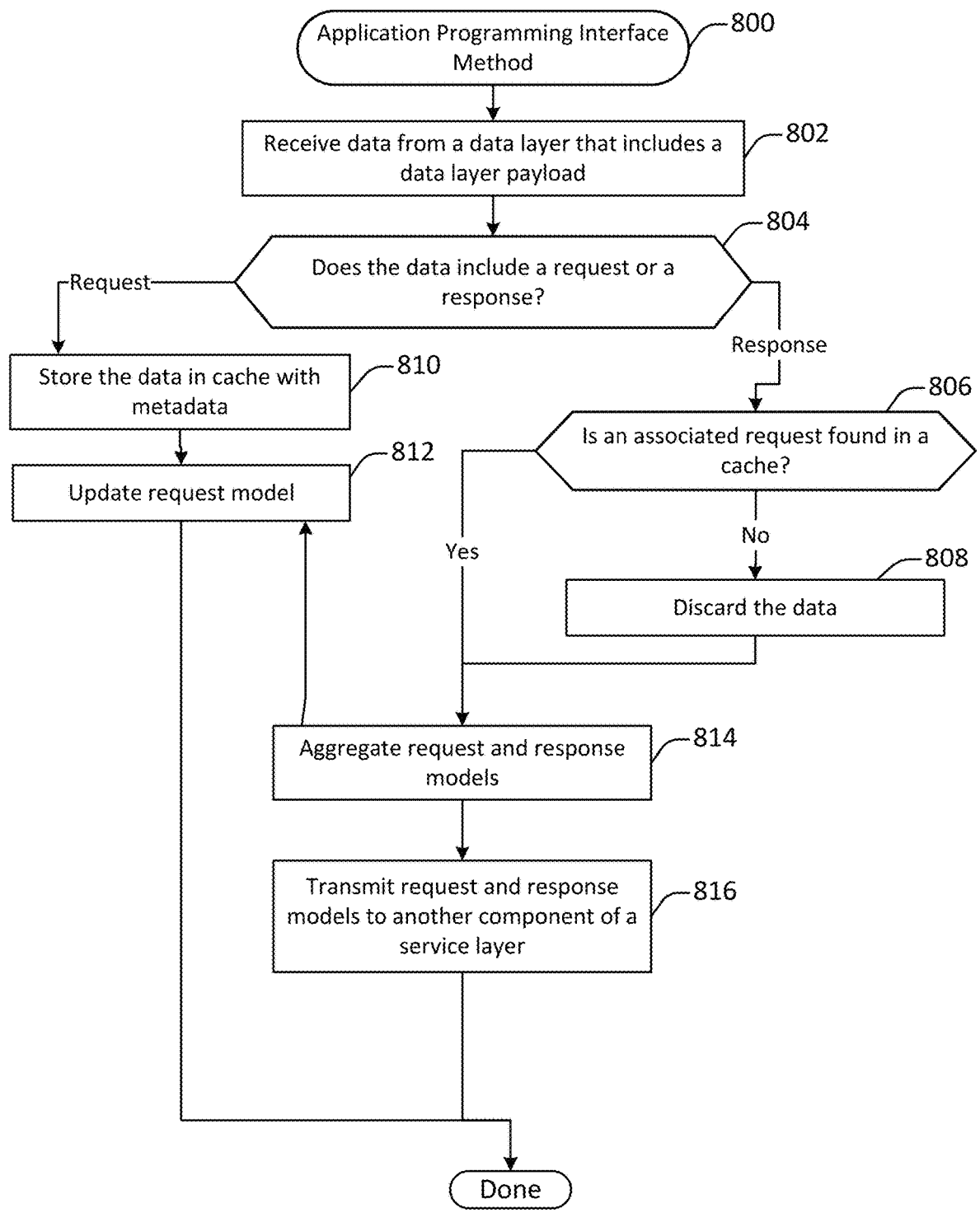
FIG. 8 illustrates yet another example of a method for application programming interface model generation, according to one or more implementations.

FIG. 8 illustrates yet another example of a method for application programming interface model generation, according to one or more implementations. As discussed above, a computing platform may be configured to facilitate the automation of generation of various components of APIs and API models. Accordingly, a method, such as method 800, may be performed to generate temporary data for the partial generation of API models. Accordingly, data generated by method 800 may be used by other methods, such as method 600 discussed above.

Method 800 may perform operation 802 during which data may be received from a data layer. In various implementations the data layer may include a data layer payload. Accordingly, method 800 may be performed responsive to determining that data received from the data layer includes a data payload. As will be discussed in greater detail below, the data layer payload may include various information about one or more function calls as well as associated metadata.

Method 800 may perform operation 804 during which it may be determined if the data includes a request or a response. As similarly discussed above, such a determination may be made based on one or more identifiers included in the data layer payload. For example, the one or more identifiers may identify a type of function call as a request or a response. If it is determined that the data includes a response, method 800 may proceed to operation 806.

Method 800 may perform operation 806 during which it may be determined if an associated request has been found in a cache. In various implementations, the cache may be included in a database system and may store a mapping of known responses and requests. Accordingly, a mapping may be used to look up a request corresponding to the received response. In various implementations, the mapping may be generated based, at least in part, on cached identifiers associated with the requests and responses. For example, when a request is issued in a data layer, a channel instance may be generated for the request, and a response may be sent via the same channel instance. The channel instance may be a communications channel between two components that is assigned its own unique identifier. The unique identifier may be stored and used as a key to subsequently identify associated requests and responses. As discussed above, such identifiers may be sent and stored as metadata.

If it is determined that no associated request has been found, method 800 may perform operation 800 during which the data may be discarded. If it is determined that an associated request has been found, method 800 may proceed to operation 814 during which a model associated with the request and a model associated with the response may be aggregated and combined. In this way, linked requests and responses may be identified and stored as linked request models and response models, also referred to as interactions. Moreover, in some implementations, a request model may be updated to remove the request from the cache, as will be discussed in greater detail below with reference to operation 812.

Method 800 may perform operation 816 during which the request and the response models may be transmitted to another component of the service layer. Accordingly, as discussed above with reference to FIG. 6, the request and response models may underly the dependency models and API models discussed above, and may be used to generate such models.

Returning to operation 804, if it is determined that the data includes a request, method 800 may perform operation 810 during which the request may be stored in the cache. Accordingly, the request as well as associated identifiers and metadata may be stored in the cache as a request model.

Method 800 may perform operation 812 during which a request model may be updated. In various implementations, the updating of the request model may be removing the request from the cache. Moreover, operation 812 may be performed responsive to a designated period of time passing. For example, if a designated period of time passes with no response, the request may be removed from the cache. In this way, a request may be stored and cached as a request model for a designated period of time. If no associated or linked response is identified for the request model within that designated period of time, it may be discarded. If the associated or linked response is identified, they may be aggregated and stored as an interaction in an API model.

Figure 9:
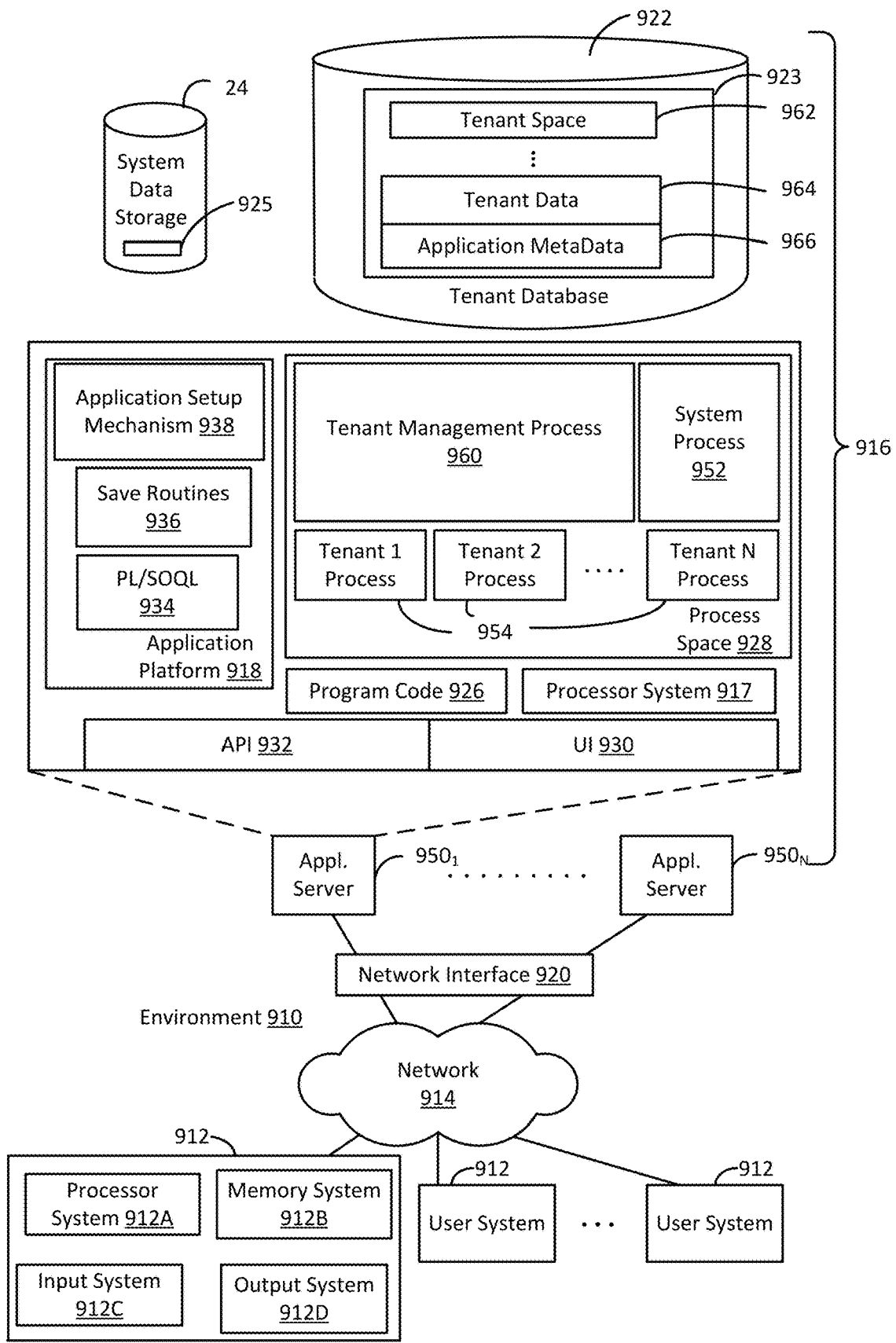
FIG. 9 shows a block diagram of an example of an environment that includes an on-demand database service configured in accordance with some implementations.

FIG. 9 shows a block diagram of an example of an environment 910 that includes an on-demand database service configured in accordance with some implementations. Environment 910 may include user systems 912, network 914, database system 916, processor system 917, application platform 918, network interface 920, tenant data storage 922, tenant data 923, system data storage 924, system data 925, program code 926, process space 928, User Interface (UI) 930, Application Program Interface (API) 932, PL/SOQL 934, save routines 936, application setup mechanism 938, application servers 950-1 through 950-N, system process space 952, tenant process spaces 954, tenant management process space 960, tenant storage space 962, user storage 964, and application metadata 966. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 916, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 918 may be a framework that allows the creation, management, and execution of applications in system 916. Such applications may be developed by the database service provider or by users or third-party application developers accessing the service. Application platform 918 includes an application setup mechanism 938 that supports application developers' creation and management of applications, which may be saved as metadata into tenant data storage 922 by save routines 936 for execution by subscribers as one or more tenant process spaces 954 managed by tenant management process 960 for example. Invocations to such applications may be coded using PL/SOQL 934 that provides a programming language style interface extension to API 932. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 966 for a subscriber making such an invocation. Such system processes may also manage execution of application metadata 966 as an application in a virtual machine.

In some implementations, each application server 950 may handle requests for any user associated with any organization. A load balancing function (e.g., an F5 Big-IP load balancer) may distribute requests to the application servers 950 based on an algorithm such as least-connections, round robin, observed response time, etc. Each application server 950 may be configured to communicate with tenant data storage 922 and the tenant data 923 therein, and system data storage 924 and the system data 925 therein to serve requests of user systems 912. The tenant data 923 may be divided into individual tenant storage spaces 962, which can be either a physical arrangement and/or a logical arrangement of data. Within each tenant storage space 962, user storage 964 and application metadata 966 may be similarly allocated for each user. For example, a copy of a user's most recently used (MRU) items might be stored to user storage 964. Similarly, a copy of MRU items for an entire tenant organization may be stored to tenant storage space 962. A UI 930 provides a user interface and an API 932 provides an application programming interface to system 916 resident processes to users and/or developers at user systems 912.

System 916 may implement a web-based on-demand computing system. For example, in some implementations, system 916 may include application servers configured to implement and execute distributed software applications as well as APIs for services of such distributed software applications. The application servers may be configured to provide related data, code, forms, web pages and other information to and from user systems 912. Additionally, the application servers may be configured to store information to, and retrieve information from a database system. Such information may include related data, objects, and/or Webpage content. With a multi-tenant system, data for multiple tenants may be stored in the same physical database object in tenant data storage 922, however, tenant data may be arranged in the storage medium(s) of tenant data storage 922 so that data of one tenant is kept logically separate from that of other tenants. In such a scheme, one tenant may not access another tenant's data, unless such data is expressly shared.

Several elements in the system shown in FIG. 9 include conventional, well-known elements that are explained only briefly here. For example, user system 912 may include processor system 912A, memory system 912B, input system 912C, and output system 912D. A user system 912 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 912 to access, process and view information, pages and applications available from system 916 over network 914. Network 914 may be any network or combination of networks of devices that communicate with one another, such as any one or any combination of a LAN (local area network), WAN (wide area network), wireless network, or other appropriate configuration.

The users of user systems 912 may differ in their respective capacities, and the capacity of a particular user system 912 to access information may be determined at least in part by "permission" of the particular user system 912. As discussed herein, permission generally govern access to computing resources such as data objects, components, and other entities of a computing system, such as endpoints, a social networking system, and/or a CRM database system. "Permission sets" generally refer to groups of permission that may be assigned to users of such a computing environment. For instance, the assignments of users and permission sets may be stored in one or more databases of System 916. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permission to be assigned to the users fitting the attributes. Permission sets meeting the criteria may be selected and assigned to the users. Moreover, permission may appear in multiple permission sets. In this way, the users can gain access to the components of a system.

In some an on-demand database service environments, an Application Programming Interface (API) may be configured to expose a collection of permission and their assignments to users through appropriate network-based services and architectures, for instance, using Simple Object Access Protocol (SOAP) Web Service and Representational State Transfer (REST) APIs.

In some implementations, a permission set may be presented to an administrator as a container of permission. However, each permission in such a permission set may reside in a separate API object exposed in a shared API that has a child-parent relationship with the same permission set object. This allows a given permission set to scale to millions of permission for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permission across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 916 may provide on-demand database service to user systems 912 using an MTS arrangement. By way of example, one tenant organization may be a company that employs a sales force where each salesperson uses system 916 to manage their sales process. Thus, a user in such an organization may maintain contact data, leads data, customer follow-up data, performance data, goals and progress data, etc., all applicable to that user's personal sales process (e.g., in tenant data storage 922). In this arrangement, a user may manage his or her sales efforts and cycles from a variety of devices, since relevant data and applications to interact with (e.g., access, view, modify, report, transmit, calculate, etc.) such data may be maintained and accessed by any user system 912 having network access.

When implemented in an MTS arrangement, system 916 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 916 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 916 may also maintain system-level data usable by multiple tenants or other data. Such system-level data may include industry reports, news, postings, and the like that are sharable between tenant organizations.

In some implementations, user systems 912 may be client systems communicating with application servers 950 to request and update system-level and tenant-level data from system 916. By way of example, user systems 912 may send one or more queries requesting data of a database maintained in tenant data storage 922 and/or system data storage 924. An application server 950 of system 916 may automatically generate one or more SQL statements (e.g., one or more SQL queries) that are designed to access the requested data. System data storage 924 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 10A:
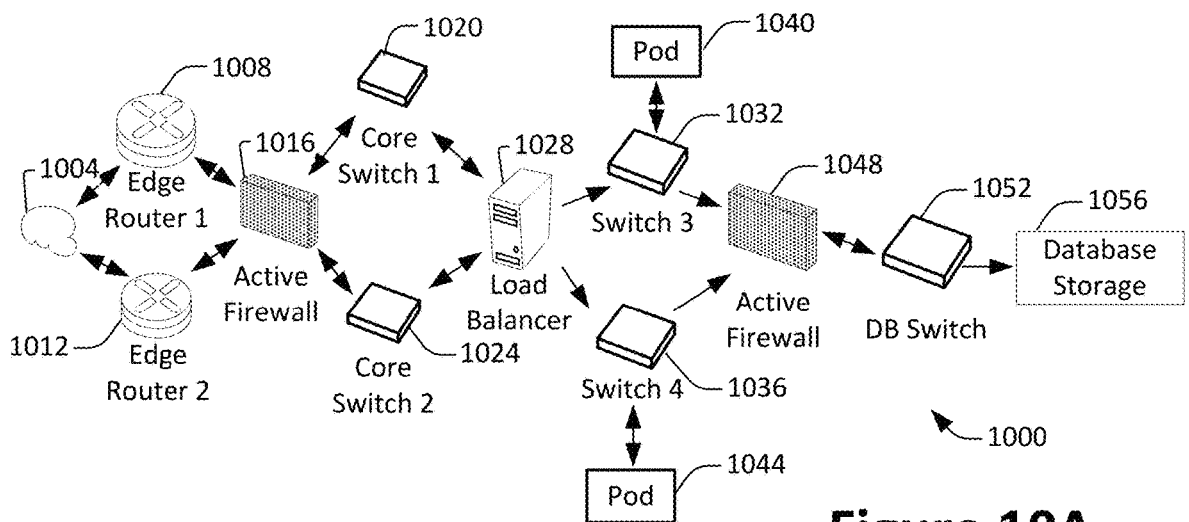
FIG. 10A shows a system diagram of an example of architectural components of an on-demand database service environment, configured in accordance with some implementations.

FIG. 10A shows a system diagram of an example of architectural components of an on-demand database service environment 1000, configured in accordance with some implementations. A client machine located in the cloud 1004 may communicate with the on-demand database service environment via one or more edge routers 1008 and 1012. A client machine may include any of the examples of user systems ?12 described above. The edge routers 1008 and 1012 may communicate with one or more core switches 1020 and 1024 via firewall 1016. The core switches may communicate with a load balancer 1028, which may distribute server load over different pods, such as the pods 1040 and 1044 by communication via pod switches 1032 and 1036. The pods 1040 and 1044, which may each include one or more servers and/or other computing resources, may perform data processing and other operations used to provide on-demand services. Components of the environment may communicate with a database storage 1056 via a database firewall 1048 and a database switch 1052.

Accessing an on-demand database service environment may involve communications transmitted among a variety of different components. The environment 1000 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 10A and 10B.

The cloud 1004 refers to any suitable data network or combination of data networks, which may include the Internet. Client machines located in the cloud 1004 may communicate with the on-demand database service environment 1000 to access services provided by the on-demand database service environment 1000. By way of example, client machines may access the on-demand database service environment 1000 to retrieve, store, edit, and/or process user and/or application information.

In some implementations, the edge routers 1008 and 1012 route packets between the cloud 1004 and other components of the on-demand database service environment 1000. The edge routers 1008 and 1012 may employ the Border Gateway Protocol (BGP). The edge routers 1008 and 1012 may maintain a table of IP networks or 'prefixes', which designate network reachability among autonomous systems on the internet.

In one or more implementations, the firewall 1016 may protect the inner components of the environment 1000 from internet traffic. The firewall 1016 may block, permit, or deny access to the inner components of the on-demand database service environment 1000 based upon a set of rules and/or other criteria. The firewall 1016 may act as one or more of a packet filter, an application gateway, a stateful filter, a proxy server, or any other type of firewall.

In some implementations, the core switches 1020 and 1024 may be high-capacity switches that transfer packets within the environment 1000. The core switches 1020 and 1024 may be configured as network bridges that quickly route data between different components within the on-demand database service environment. The use of two or more core switches 1020 and 1024 may provide redundancy and/or reduced latency.

In some implementations, communication between the pods 1040 and 1044 may be conducted via the pod switches 1032 and 1036. The pod switches 1032 and 1036 may facilitate communication between the pods 1040 and 1044 and client machines, for example via core switches 1020 and 1024. Also or alternatively, the pod switches 1032 and 1036 may facilitate communication between the pods 1040 and 1044 and the database storage 1056. The load balancer 1028 may distribute workload between the pods, which may assist in improving the use of resources, increasing throughput, reducing response times, and/or reducing overhead. The load balancer 1028 may include multilayer switches to analyze and forward traffic.

In some implementations, access to the database storage 1056 may be guarded by a database firewall 1048, which may act as a computer application firewall operating at the database application layer of a protocol stack. The database firewall 1048 may protect the database storage 1056 from application attacks such as structure query language (SQL) injection, database rootkits, and unauthorized information disclosure. The database firewall 1048 may include a host using one or more forms of reverse proxy services to proxy traffic before passing it to a gateway router and/or may inspect the contents of database traffic and block certain content or database requests. The database firewall 1048 may work on the SQL application level atop the TCP/IP stack, managing applications' connection to the database or SQL management interfaces as well as intercepting and enforcing packets traveling to or from a database network or application interface.

In some implementations, the database storage 1056 may be an on-demand database system shared by many different organizations. The on-demand database service may employ a single-tenant approach, a multi-tenant approach, a virtualized approach, or any other type of database approach. Communication with the database storage 1056 may be conducted via the database switch 1052. The database storage 1056 may include various software components for handling database queries. Accordingly, the database switch 1052 may direct database queries transmitted by other components of the environment (e.g., the pods 1040 and 1044) to the correct components within the database storage 1056.

Figure 10B:
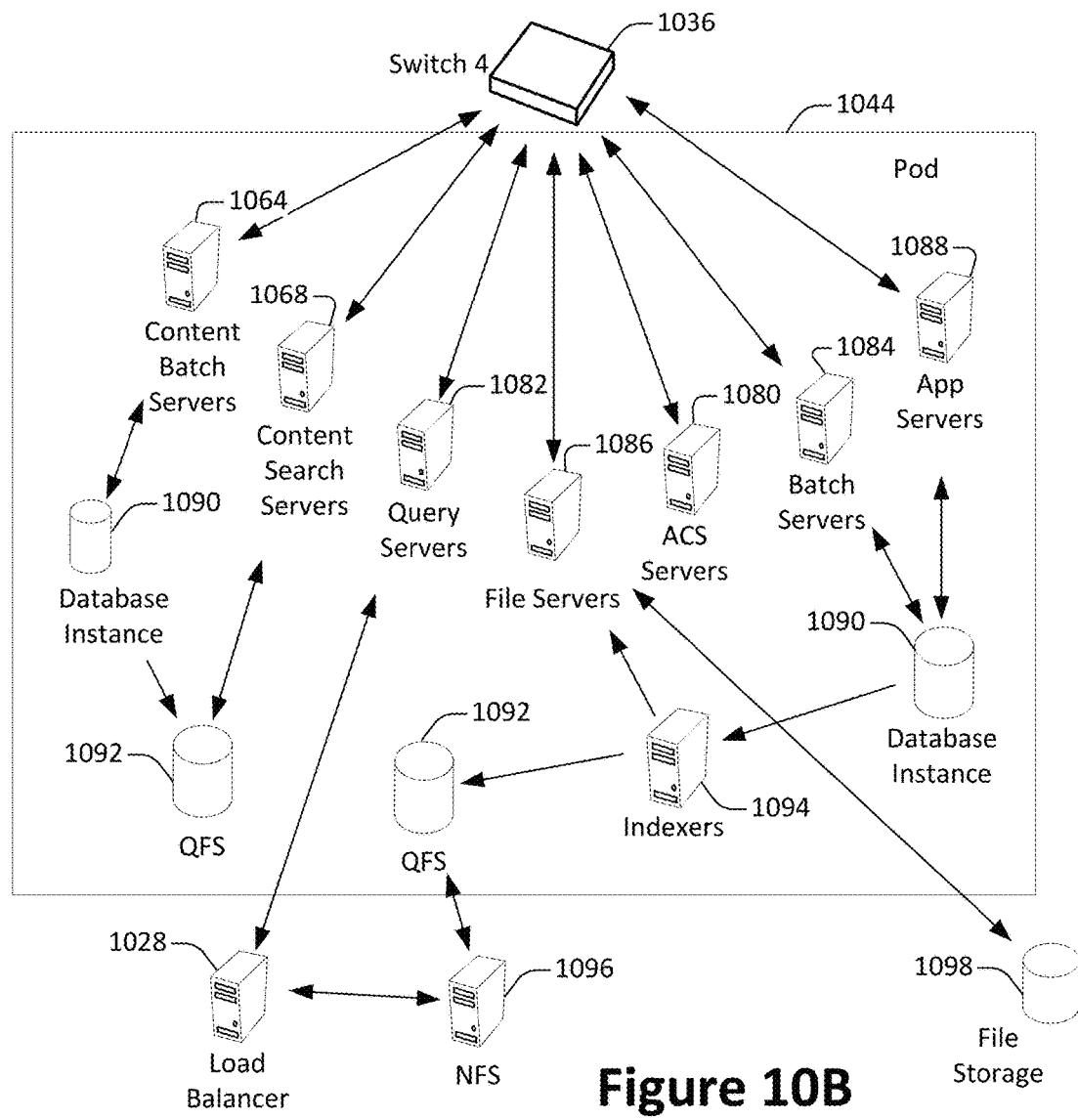
FIG. 10B shows a system diagram further illustrating an example of architectural components of an on-demand database service environment, in accordance with some implementations.

FIG. 10B shows a system diagram further illustrating an example of architectural components of an on-demand database service environment, in accordance with some implementations. The pod 1044 may be used to render services to user(s) of the on-demand database service environment 1000. The pod 1044 may include one or more content batch servers 1064, content search servers 1068, query servers 1082, file servers 1086, access control system (ACS) servers 1080, batch servers 1084, and app servers 1088. Also, the pod 1044 may include database instances 1090, quick file systems (QFS) 1092, and indexers 1094. Some or all communication between the servers in the pod 1044 may be transmitted via the switch 1036.

In some implementations, the app servers 1088 may include a framework dedicated to the execution of procedures (e.g., programs, routines, scripts) for supporting the construction of applications provided by the on-demand database service environment 1000 via the pod 1044. One or more instances of the app server 1088 may be configured to execute all or a portion of the operations of the services described herein.

In some implementations, as discussed above, the pod 1044 may include one or more database instances 1090. A database instance 1090 may be configured as an MTS in which different organizations share access to the same database, using the techniques described above. Database information may be transmitted to the indexer 1094, which may provide an index of information available in the database 1090 to file servers 1086. The QFS 1092 or other suitable filesystem may serve as a rapid-access file system for storing and accessing information available within the pod 1044. The QFS 1092 may support volume management capabilities, allowing many disks to be grouped together into a file system. The QFS 1092 may communicate with the database instances 1090, content search servers 1068 and/or indexers 1094 to identify, retrieve, move, and/or update data stored in the network file systems (NFS) 1096 and/or other storage systems.

In some implementations, one or more query servers 1082 may communicate with the NFS 1096 to retrieve and/or update information stored outside of the pod 1044. The NFS 1096 may allow servers located in the pod 1044 to access information over a network in a manner similar to how local storage is accessed. Queries from the query servers 1022 may be transmitted to the NFS 1096 via the load balancer 1028, which may distribute resource requests over various resources available in the on-demand database service environment 1000. The NFS 1096 may also communicate with the QFS 1092 to update the information stored on the NFS 1096 and/or to provide information to the QFS 1092 for use by servers located within the pod 1044.

In some implementations, the content batch servers 1064 may handle requests internal to the pod 1044. These requests may be long-running and/or not tied to a particular customer, such as requests related to log mining, cleanup work, and maintenance tasks. The content search servers 1068 may provide query and indexer functions such as functions allowing users to search through content stored in the on-demand database service environment 1000. The file servers 1086 may manage requests for information stored in the file storage 1098, which may store information such as documents, images, basic large objects (BLOBS), etc. The query servers 1082 may be used to retrieve information from one or more file systems. For example, the query system 1082 may receive requests for information from the app servers 1088 and then transmit information queries to the NFS 1096 located outside the pod 1044. The ACS servers 1080 may control access to data, hardware resources, or software resources called upon to render services provided by the pod 1044. The batch servers 1084 may process batch jobs, which are used to run tasks at specified times. Thus, the batch servers 1084 may transmit instructions to other servers, such as the app servers 1088, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 11:
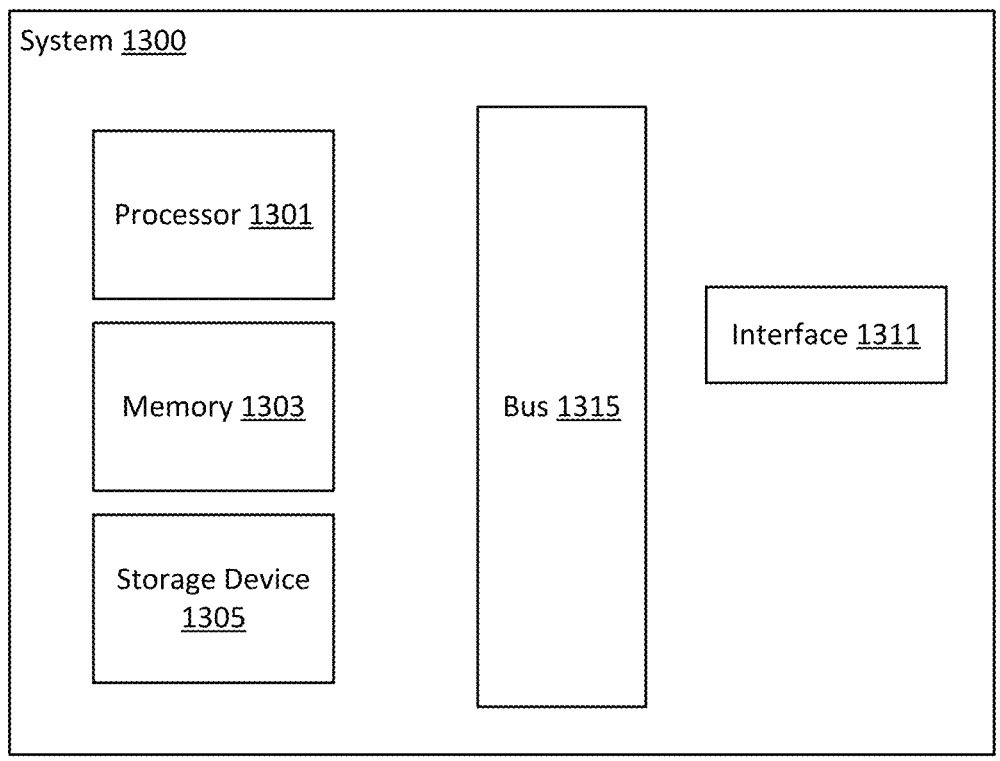
FIG. 11 illustrates one example of a computing device.

FIG. 11 illustrates one example of a computing device. According to various embodiments, a system 1100 suitable for implementing embodiments described herein includes a processor 1101, a memory module 1103, a storage device 1105, an interface 1111, and a bus 1115 (e.g., a PCI bus or other interconnection fabric.) System 1100 may operate as variety of devices such as an application server, a database server, or any other device or service described herein. Although a particular configuration is described, a variety of alternative configurations are possible. The processor 1101 may perform operations such as those described herein. Instructions for performing such operations may be embodied in the memory 1103, on one or more non-transitory computer readable media, or on some other storage device. Various specially configured devices can also be used in place of or in addition to the processor 1101. The interface 1111 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

What is claimed is:

1. A method comprising:
monitoring application programming interface (API) traffic for a service API associated with a service coupled to a service layer and a data layer of a database system, the monitoring comprising monitoring API calls received at and made by the service API within via a network mesh implemented by the data layer of the database system;
storing a representation of the API traffic monitored via the data layer in the database system, the representation including at least an API call identifier and metadata for each monitored API call associated with the service;
constructing, using the service layer, one or more API models based, at least in part, on the representation of the API traffic, the one or more API models being configured to represent a plurality of API interactions monitored for the service; and
constructing one or more API objects based, at least in part, on the API models, the one or more API objects being one or more components of the service API,
wherein the API object is a mock service object configured to simulate the operation of a service, and wherein the service is a containerized service.

2. The method of claim 1, wherein the API traffic comprises at least one function call.

3. The method of claim 2, wherein the generating of the one or more API objects comprises:
parsing the one or more API models into extracted information; and
generating the one or more API object based, at least in part, on the extracted information.

4. The method of claim 1, wherein the service is an observed service identified based on a designated list of observed services.

5. The method of claim 1, wherein the API object is an API specification object configured in accordance with a designated API specification.

6. The method of claim 1, wherein the API object is a test data object configured to test one or more function calls.

7. A server system comprising one or more processors configured to implement a computing platform, the server system configured to perform:
monitoring application programming interface (API) traffic for a service API associated with a service coupled to a service layer and a data layer of a database system, the monitoring comprising monitoring API calls received at and made by the service API within via a network mesh implemented by the data layer of the database system;

storing a representation of the API traffic monitored via the data layer in the database system, the representation including at least an API call identifier and metadata for each monitored API call associated with the service;

constructing, using the service layer, one or more API models based, at least in part, on the representation of the API traffic, the one or more API models being configured to represent a plurality of API interactions monitored for the service; and constructing one or more API objects based, at least in part, on the API models, the one or more API objects being one or more components of the service API, wherein the API object is a mock service object configured to simulate the operation of a service, and wherein the service is a containerized service.

8. The computing platform of claim 7, wherein the API traffic comprises at least one function call.

9. The computing platform of claim 8, wherein the function call is made by the service.

10. The computing platform of claim 8, wherein the generating of the one or more API objects comprises:

parsing the one or more API models into extracted information; and generating the one or more API object based, at least in part, on the extracted information.

11. The computing platform of claim 7, wherein the service is an observed service identified based on a designated list of observed services.

12. The computing platform of claim 7, wherein the API object is an API specification object configured in accordance with a designated API specification.

13. The computing platform of claim 7, wherein the API object is a test data object configured to test one or more function calls.

14. A computer program product comprising non-transitory computer-readable program code capable of being executed by one or more processors when retrieved from a non-transitory computer-readable medium, the program code comprising instructions configurable to cause the one or more processors to perform a method comprising:

monitoring application programming interface (API) traffic for a service API associated with a service coupled to a service layer and a data layer of a database system, the monitoring comprising monitoring API calls received at and made by the service API within via a network mesh implemented by the data layer of the database system;

storing a representation of the API traffic monitored via the data layer in the database system, the representation including at least an API call identifier and metadata for each monitored API call associated with the service;

constructing, using the service layer, one or more API models based, at least in part, on the representation of the API traffic, the one or more API models being configured to represent a plurality of API interactions monitored for the service; and constructing one or more API objects based, at least in part, on the API models, the one or more API objects being one or more components of the service API, wherein the API object is a mock service object configured to simulate the operation of a service, and wherein the service is a containerized service.

15. The computer program product recited in claim 14, wherein the API traffic comprises at least one function call, and wherein the generating of the one or more API objects comprises:

parsing the one or more API models into extracted information; and generating the one or more API object based, at least in part, on the extracted information.

16. The computer program product recited in claim 14, wherein the service is an observed service identified based on a designated list of observed services.

\* \* \* \* \*